US010069744B2

(12) United States Patent
De Schepper et al.

(10) Patent No.: US 10,069,744 B2
(45) Date of Patent: Sep. 4, 2018

(54) METHOD AND APPARATUS FOR MANAGING NETWORK CONGESTION

(71) Applicant: Alcatel Lucent, Boulogne-Billancourt (FR)

(72) Inventors: Koen A E De Schepper, Edegem (BE); Ing-Jyh Tsang, Waasmunster (BE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/974,213

(22) Filed: Dec. 18, 2015

(65) Prior Publication Data
US 2017/0019343 A1    Jan. 19, 2017

Related U.S. Application Data

(60) Provisional application No. 62/192,407, filed on Jul. 14, 2015.

(51) Int. Cl.
| | |
|---|---|
| *H04L 12/863* | (2013.01) |
| *H04L 12/823* | (2013.01) |
| *H04L 12/801* | (2013.01) |
| *H04L 12/835* | (2013.01) |
| *H04L 12/833* | (2013.01) |
| *H04L 12/26* | (2006.01) |
| *H04L 12/841* | (2013.01) |

(52) U.S. Cl.
CPC .......... *H04L 47/32* (2013.01); *H04L 43/0894* (2013.01); *H04L 47/193* (2013.01); *H04L 47/30* (2013.01); *H04L 47/31* (2013.01); *H04L 47/50* (2013.01); *H04L 47/28* (2013.01); *H04L 47/326* (2013.01)

(58) Field of Classification Search
None
See application file for complete search history.

(56) References Cited

U.S. PATENT DOCUMENTS

| 6,771,602 B1 * | 8/2004 | Benmohamed | H04L 12/5601 370/230.1 |
| 7,336,672 B1 * | 2/2008 | Aweya | H04L 47/10 370/412 |

(Continued)

OTHER PUBLICATIONS

Floyd, Random Early Detection Gateways for Congestion Avoidance, Aug. 1993, IEEE/ACM document, all pages.*

*Primary Examiner* — Brandon M Renner
(74) *Attorney, Agent, or Firm* — Nokia Technologies Oy

(57) ABSTRACT

A manner of managing congestion in a data-traffic network. In one embodiment a network node such as a bridge, switch, or router includes an AQM having a PI controller configured to calculate p' using the difference between Q and a Target Q, wherein p' is $p^{0.5}$ and p is the probability that a received packet will be dropped or marked, and some drop decision functions are configured to indicate that the node should drop a received packet by comparing p' to two random values. A marking decision function may also be present and configured to indicate that the node should mark a received packet by comparing p' to one random value. A congestion control classifier, which is in some embodiments an ECN classifier, is also present to classify a received packet and facilitate making the proper dropping or marking decision.

14 Claims, 3 Drawing Sheets

(56) References Cited

U.S. PATENT DOCUMENTS

| | | | |
|---|---|---|---|
| 7,636,307 B2* | 12/2009 | Thibodeau | H04L 47/10 370/230.1 |
| 2003/0223362 A1* | 12/2003 | Mathews | H04L 12/5693 370/230 |
| 2005/0018668 A1* | 1/2005 | Cheriton | H04L 47/10 370/389 |
| 2008/0002617 A1* | 1/2008 | Peisa | H04W 72/1231 370/329 |
| 2010/0027425 A1* | 2/2010 | Cheung | H04L 47/326 370/238 |
| 2012/0182870 A1* | 7/2012 | Francini | H04L 47/12 370/235 |
| 2013/0028080 A1* | 1/2013 | Rao | H04L 47/6215 370/230 |
| 2013/0136000 A1* | 5/2013 | Torres | H04L 47/27 370/235 |

\* cited by examiner

100

200

METHOD AND APPARATUS FOR MANAGING NETWORK CONGESTION

CROSS-REFERENCE TO RELATED APPLICATIONS

The present disclosure is related to and claims priority from U.S. Provisional Patent Application Ser. No. 62/192,407, entitled Method and Apparatus for Controlling Network Congestion and filed on 14 Jul. 2015, the entire contents of which are incorporated by reference herein.

TECHNICAL FIELD

The present invention relates generally to the field of communication networks, and, more particularly, to a method and apparatus for managing congestion in a data communication network.

BACKGROUND

The following abbreviations are herewith expanded, at least some of which are referred to within the following description of the state-of-the-art and the present invention.
AQM Active Queue Management
DCTCP Data Center TCP
ECN Explicit Congestion Notification
IETF Internet Engineering Task Force
IP Internet Protocol
PIE Proportional Integral controller Enhanced
$PI^2$ PI Improved
RTT Round Trip Time
TCP Transmission Control Protocol A communication network may be used to transport data from one device to another over short or long distances. The data may represent information such as emails, voice calls, or streaming video. Older networks such as a PSTN (public switched telephone network) would use a system of mechanical or electrical switches to establish a compete circuit between the devices for this purpose, but currently data-routing networks such as the Internet are becoming dominant.

In a data-routing network, information to be conveyed from one device to another is converted into digital form, a series of numbers, and transmitted to the network along with an indication of its intended destination. The data will often travel through many intermediate devices, which may be called nodes and which receive the transmitted information and forward it on the next leg of its journey.

For this to work, of course, there must be agree-upon rules or protocols so each node understands where to forward received information. One protocol used by the Internet, for example, is TCP (transmission control protocol). When being transported, digital data is grouped into packets, each with its own added header that includes the address of the packet's destination. Transmitted information such as a document or multi-media presentation may be sent divided into a great many packets, so also included in a packet header is information to facilitate reassembling the data in the packets into its intended form. When a packet is received at its destination, it returns an acknowledgement to the source. If no acknowledgement is received after a certain time, the packet may be re-transmitted.

Although each node is capable of forwarding received packets at great speed, the vast quantity of data traffic and the necessity of reading the address information require that the data packets must be temporarily stored in a memory device often referred to as a buffer or queue. While the delay involved is often not perceptible or at least inconvenient, at time the network may become congested due to the amount of traffic that is being conveyed. Protocols therefore include rules and guidelines intended to reduce congestion or in some cases prioritize certain traffic flows.

In general, congestion control involves monitoring data traffic and communicating congestion status to source devices so that they can adjust their rates of transmission. As one example, some currently deployed TCP congestion controller implementations in the Internet adapt their throughput rate (r) proportionally to the reciprocal of the square root of the congestion signals from the network:

$r = C/p^{1/2} \cdot RTT$ where:
p is the probability of marked or dropped packets;
C is a constant 1.22 (for Reno flows); and
RTT the round trip time between a source and a destination.

Controlling this probability in the network is difficult as there is no linear relation to the number of flows (N): $\tilde{N} = p^{1/2}$. The result is that an AQM (Active Queue Management) with a PI (proportional integral) controller in the network has a limited range of optimal control.

PIE (PI controller extended) is an extension to the earlier PI AQM congestion controller. One of the extensions of PIE is the auto-tuning to the level of congestion that is required by the original PI AQM.

PIE defines ranges of the controlled probability where it applies different (optimal for the center-point of the range) proportional and integral gain factors. It is a stepwise solution, and the more steps defined, the more parameters are required, but the better the control. Still, a more straightforward but effective solution would be desirable.

Note that the techniques or schemes described herein as existing or possible are presented as background for the present invention, but no admission is made thereby that these techniques and schemes were heretofore commercialized or known to others besides the inventors.

SUMMARY

The present disclosure is directed to a manner of managing congestion in a data-traffic network.

In one aspect, a network-congestion apparatus such as a network node controls the square root of p ($p' = p^{1/2}$) and applies a squared ($p'^2 = p$) to make marking or dropping decisions. In this solution there is no need to auto-tune the gain factors, and constant and continuous optimal gain factors can be used. Additionally p' can be applied directly to scalable congestion control, providing rate equalization for example in a DCTCP (data center TCP) environment.

In another aspect, a method of data traffic congestion management includes receiving data packets, placing at least a portion of the received packets in a queue buffer, measuring the load of the queue buffer to extract at least one queue parameter Q, providing the at least one queue parameter to an AQM, calculating p' as a function of the difference between Q and a Target Q, wherein p' is $p^{0.5}$ and p is the probability that a received packet will be dropped or marked, determining whether to apply a drop decision or mark decision to a received packet, and determining, if applying a drop decision to a classic flow packet, whether to drop a received packet by comparing p' to two random values. The method may also include determining, if applying a mark decision to a scalable flow, whether to mark a received packet by comparing p' to one random value.

In another aspect, a network node includes a memory device, a processor in communication with the memory device, a network interface configured to at least receive and to send packet traffic, a packet queue buffer configured to buffer at least a portion of the received packet traffic, a queue measurement module configured to extract at least one queue status parameter; an AQM in communication with the queue measurement module, comprising a PI controller configured to calculate p' using the at least one queue status parameter and a drop decision function configured to make a drop decision d for packets of the packet traffic, and a drop function for dropping any packets of the packet traffic as indicated by drop decision d. The network node AQM may also include a marking decision function configured to make a marking decision m based on p'. In that case a marking function may present to mark any packets of the packet traffic as indicated by marking decision m.

In another aspect, a non-transitory computer-readable storage medium stores computer readable instructions, which when executed by at least one processor, implement a method for congestion management, for example a method including receiving data packets, placing at least a portion of the received packets in a queue buffer, measuring load of queue buffer to extract at least one queue parameter Q, providing the at least at least one queue parameter to an AQM, calculating p' using the difference between Q and a Target Q, wherein p' is $p^{0.5}$ and p is the probability that a received packet will be dropped or marked, determining whether to apply a drop decision or mark decision to a received packet, and determining, if applying a drop decision to a classic flow packet, whether to drop a received packet by comparing p' to two random values. The method may also include determining, if applying a mark decision to a scalable flow, whether to mark a received packet by comparing p' to one random value.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

The present disclosure is directed to a manner of controlling network congestion, sometimes referred to as AQM (active queue management). Note that herein "controlling" is used synonymously with "management" and while a reduction in congestion is anticipated, no specific alleviation of congestion is required unless recited in a particular embodiment. AQM may also be used herein to refer to an apparatus (active queue manager).

An AQM controls the number of receive packets that will be dropped rather than forwarded toward their intended destination. Selectively dropping packets is done under certain traffic conditions to reduce or eliminate high latency and jitter that often occur when too many packets have been buffered at network nodes.

In some implementations, a calculated number of packets are marked instead of being dropped. The packet's recipient notes the number of packets that are being marked and notifies the sender, which can then adjust its transmission rate as may be necessary.

Some AQM controllers may employ a PI (proportional integral) controller to calculate a probability that a given packet or packets will be dropped in an attempt to alleviate a perceived congestion problem. In one current system, known as PIE (PI enhanced), auto-tuning is performed in the PI controller.

Described herein is a method and apparatus for controlling network congestion that is easy to implement and does not require auto-tuning the configuration parameters. This solution will sometimes be referred to as $PI^2$ (PI—improved).

Figure 1:
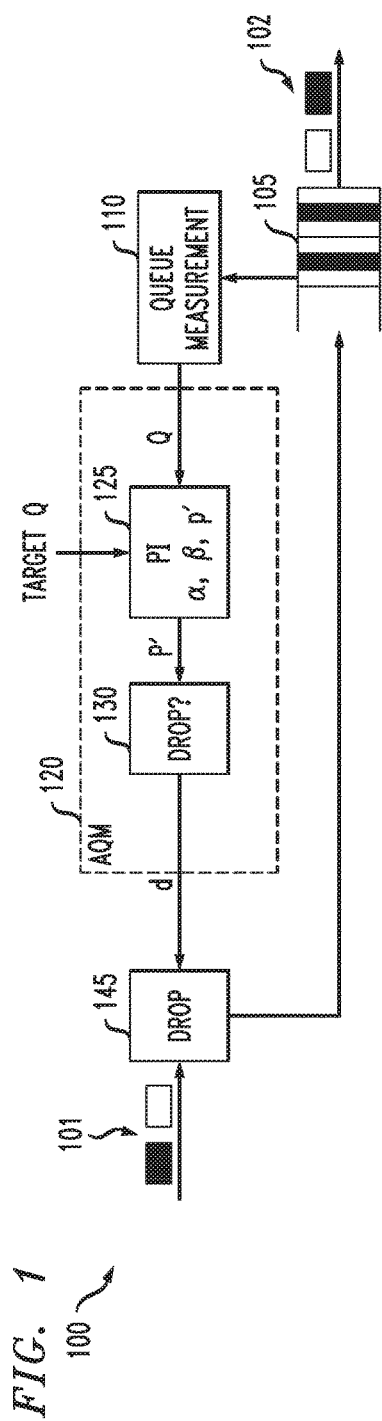
FIG. 1 is a functional block diagram illustrating selected components of a congestion management system according to an embodiment of the present invention.

FIG. 1 illustrates a congestion-management system 100 according to one embodiment. In the embodiment of FIG. 1, an AQM PI controller 125 for controlling TCP traffic is extended with a squared-drop decision function 130. Congestion-management system 100 includes a drop function 145, which receives the packets of incoming traffic flow 101 and drops selected packets based on a drop decision d from decision function 130. Packets that are not dropped by drop function 145 are enqueued in queue buffer 105. Packets in queue buffer 105 are released in outgoing traffic flow 102, typically on a first-in, first-out basis.

In this embodiment, the congestion-management system 100 also includes a queue measurement function 110 that measures or derives one or more parameters from the traffic going through the queue. These parameters may include, for example and not by way of limitation, instantaneous queue length, average queue length, packet sojourn time, incoming traffic rate, outgoing traffic rate, instantaneous packet queue overflow, and average queue overflow rate. For the sake of convenience, the measured parameter or parameters provided by the queue measurement function 110 are referred to as Q.

In the embodiment of FIG. 1, Q is provided to AQM 120, and specifically to AQM PI controller 125. Also provided to AQM 120 is a Target Q, in which of course an analogous parameter or multiple parameters are included, and typically integral ($\alpha$) and proportional ($\beta$) gain factors as well.

In this embodiment, the PI controller 125 calculates probability control value p', where $p'=\sqrt{p}$. In preferred embodiments, p' is calculated (or adjusted) according to the difference (queue error) between the actual Q of packet buffer 105 and a queue target (Target Q), in preferred embodiments applying gain factor $\alpha$ applied to the queue error, and applying gain factor $\beta$ to actual Q growth relative to a previous value. In a preferred embodiment one or both of these gain configuration parameters remain constant for all traffic flow rates, at least until re-assigned. An advantage of the present solution is that it is expected to reduce or eliminate the need for auto-tuning $\alpha$ and $\beta$ to the level of p as the flow varies. In the embodiment of FIG. 1, the probability variability factor p' is provided to the drop decision module 130 where a decision is made as to whether a packet of incoming packet flow 101 is to be dropped. In this embodiment, this decision d is made as a squared drop decision function. This decision may for example be made by comparing the provided p' value to two random values r1, r2. These random values are in this embodiment regenerated for each packet decision. If both values r1 and r2 are smaller then p', then the packet is dropped. In an alternate embodiment, one of the random values is saved and reused for the determination involving the next received packet so only one random value needs to be generated for any packet (except of course the first). Note that herein, "random" includes generated pseudorandom values, and that these values will have the same range as p'.

Figure 2:
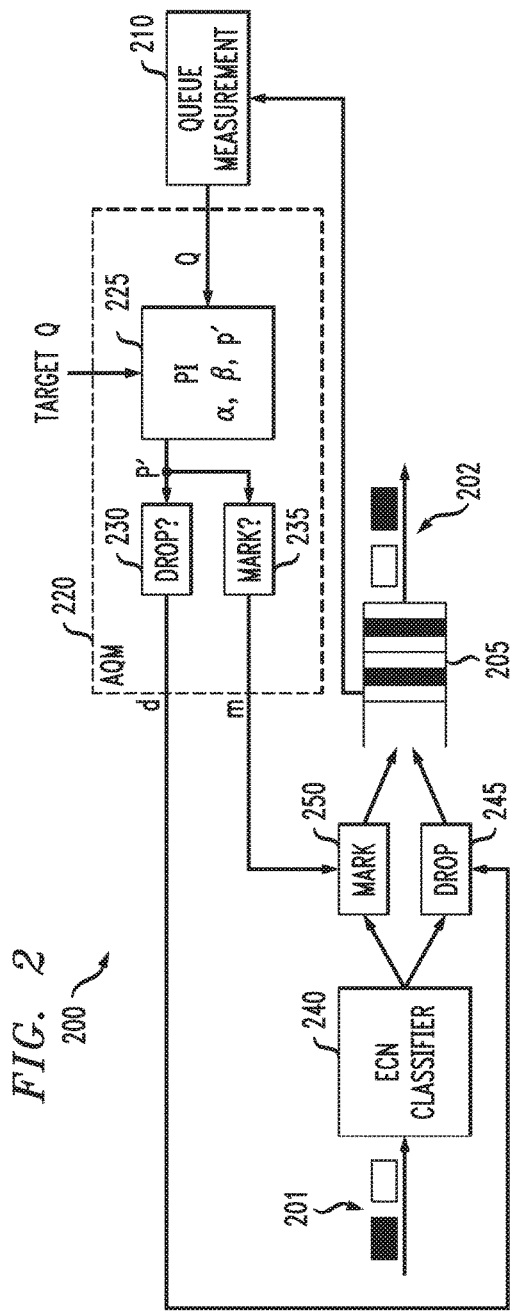
FIG. 2 is a functional block diagram illustrating selected components of a congestion management system according to another embodiment of the present invention.

FIG. 2 illustrates a congestion-management system 200 according to one embodiment. Similar to the embodiment of FIG. 1, an AQM PI controller 225 for controlling TCP traffic is extended with a squared-drop decision function 230. Congestion-management system 200 includes a drop function 245, which receives the packets of incoming traffic flow 201 and drops selected packets based on a squared drop decision d from decision function 230. Packets that are not dropped by drop function 245 are enqueued in queue buffer 205. Packets stored in queue buffer 250 are released in outgoing traffic flow 202, typically on a first-in, first-out basis.

In this embodiment, as with the embodiment of FIG. 1, the congestion-management system 200 also includes a queue measurement function 210 that measures or derives one or more parameters from the traffic going through the queue. Again, the measured parameter or parameters provided by the queue measurement function 210 are referred to as Q.

In the embodiment of FIG. 2, Q is provided to AQM 220, and specifically to AQM PI controller 225. Also provided to AQM 120 is a Target Q, in which of course a analogous parameter or multiple parameters are included, as well as integral ($\alpha$) and proportional ($\beta$) gain factors.

In the embodiment of FIG. 2, congestion control may be advantageously be applied to two congestion-control families. One of these congestion control families will be referred to herein as "classic" and are characterized in that their response to the mark/drop function is proportional to $1/p^{0.5}$ and the second are "scalable" flows characterized in that their response to mark/drop function is proportional to $1/p$. In the embodiment of FIG. 2, it is presumed that ECN (explicit congestion notification) will not be used for flows of the classic type, and so ECN classifier 240 receives the packets of incoming traffic flow 240 and in effect classifies them according to congestion-control family type. That is, a determination is made whether the incoming packets are part of a scalable flow, for example DCTCP, scalable TCP flow, relentless TCP flow, and so on based on ECN capability. Packets that are part of such flows may be selectively marked by marking function 250 according to a marking decision function m received from AQM 220. Packets associated with classic flows, on the other hand, are selectively dropped according to a squared drop decision d also provided by AQM 220. Packets of either type that are not dropped are then stored in queue 205, from which they will be sent as outgoing traffic flow 202 typically on a first-in, first-out basis.

In this embodiment, the PI controller 225 calculates probability control value p', where $p'=\sqrt{p}$. In preferred embodiments, p' is calculated (or adjusted) according to the difference (queue error) between the actual Q of packet buffer 205 and a queue target (Target Q), in preferred embodiments applying gain factor $\alpha$ applied to the queue error, and applying gain factor $\beta$ to actual Q growth relative to a previous value. In a preferred embodiment one or both of these gain configuration parameters remain constant for all traffic flow rates, at least until re-assigned. An advantage of the present solution is that it is expected to reduce or eliminate the need for auto-tuning $\alpha$ and $\beta$ to the level of p as the flow varies.

In the embodiment of FIG. 2, as in the embodiment of FIG. 1, the probability variability factor p' is provided to the drop decision module 230 where a decision is made as to whether a specific packet of incoming packet flow 201 is to be dropped. In this embodiment, this decision d is made as a squared drop decision function. This decision may be made by comparing the provided p' value to two random values r1, r2. These values are in this embodiment regenerated for each packet. If both values r1 and r2 are smaller than p, then the packet is dropped. As alluded to above, it is presumed in this embodiment that ECN will not be used for classic flows. In alternate embodiments this will not always be the case, however.

Returning to the embodiment of FIG. 2, for other flow types, specifically those scalable flows not needing a squared mark/drop signal, p' is provided by PI controller 225 to marking decision function 235. As should be apparent from FIG. 2, marking decision function 235 uses p' to determine whether a packet of an appropriate flow should be marked. In this embodiment, the marking decision function 235 receives the probability variability factor p' from PI controller 225 and decides whether a specific packet should be marked by the mark function 250 before it is placed in the queue buffer 205.

In this embodiment, this decision m is made by comparing the provided p' value to a single random value r1. This value is regenerated for each marking decision. If the value r1 is smaller than p, then the packet is marked. In this embodiment, marking decision m is only applied to the packets of certain flow types, in this embodiment those identified by ECN classifier 240 as ECN capable.

Here it is noted that in alternate embodiments, ECN capability may not be usable as a proxy for classifying according to congestion-control family. If ECN is to apply to classic TCP (as well as scalable) flows, for example, then another identifier (not shown) must be added for congestion-control family classification. This may be, for example, family classification by a special diffserv or by using the 2 available ECN capability code points (ECT(0) for classic and ECT(1) for the scalable family). These are identifiers that are available on the IP layer. Other identifiers might be used (even on other layers, but this is less optimal and not currently preferred). In such embodiments, the embodiment of FIG. 2 may be altered, for example, by substituting a "classic flow" decision function for drop decision function and a "scalable flow" decision function for mark decision function 235. A congestion-control family classifier may be present to look for the identifier used. In some cases, the resulting "drop/mark decision" according to family classification could be applied as appropriate to a mark function or a drop function as determined appropriate by the ECN classifier.

Figure 3:
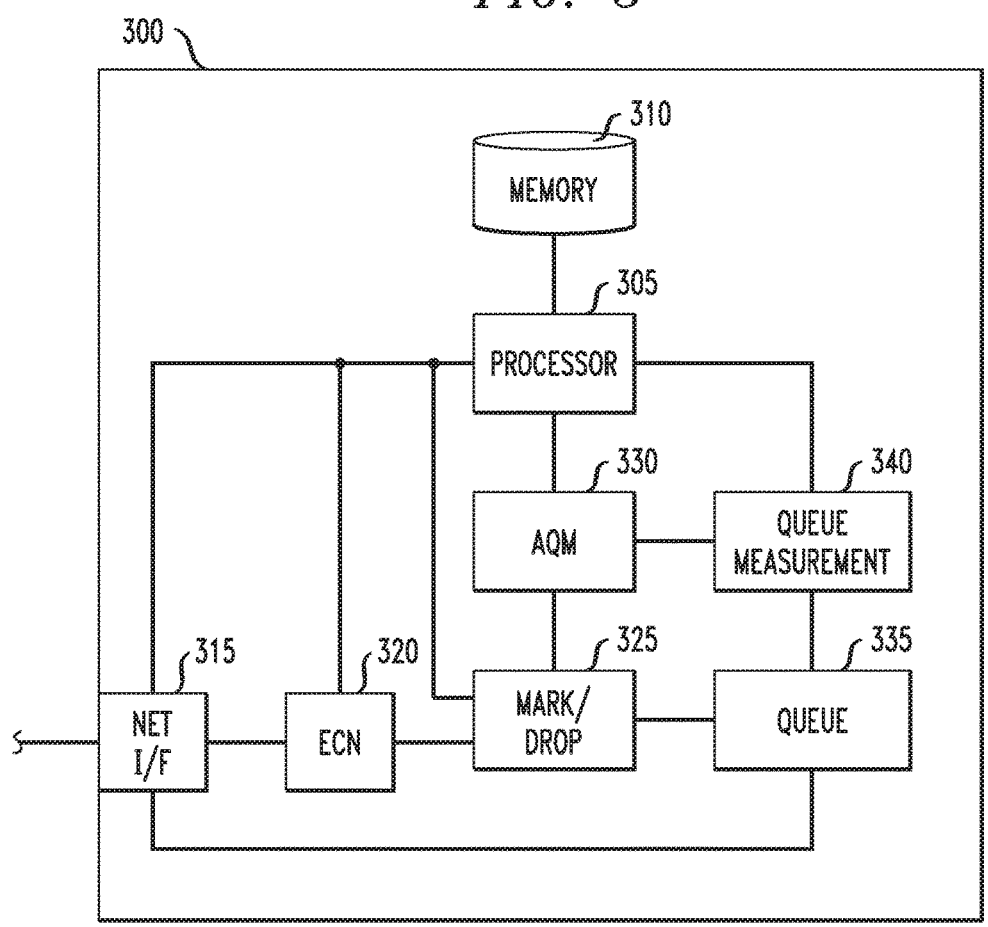
FIG. 3 is a flow diagram illustrating a method according to an embodiment of the present invention.

FIG. 3 is a functional block diagram illustrating selected components of a network node 300 according to another embodiment of the present invention. It is noted that some of the components here may be similar but not necessarily identical to those depicted in FIGS. 1 and 2, described above. In the embodiment of FIG. 3, network node 300 includes a processor 305 and is in communication with a memory device 310.

Memory device 310 in this embodiment is a physical storage device that may in some cases operate according to stored program instructions. In any case, unless explicitly recited memory 310 is non-transitory in the sense of not being merely a propagating signal. Memory 310 is used for storing, among other things, data such as a table (not separately shown) of managed devices as well as stored program instructions for execution by processor 305. Processor 305 may also control operation of some or all of the other components of network node 300.

In this embodiment, network node 300 also includes a network interface 315 for, among other things, receiving and sending packets over a communication network (not shown. Network interface 315 is in communication with an ECN classifier 320 so that received packets may be classified according to whether they are ECN capable, for example by examining the header of each packet. This determination may be supplied to a mark/drop function 325 so that an appropriate action may be taken with respect to each received packet, according to mark/drop decisions provided by AQM 330.

In the embodiment of FIG. 3, AQM 330 provides these decisions based on calculations such as those described herein. Queue buffer 335 in this embodiment stores packets that are not discarded by drop/mark function 325 until they are sent from network node 300 via network interface 315. Queue measurement module 340 monitors the status of queue buffer 335 and provides this information to AQM 330.

Note that FIGS. 1-3 illustrate selected components according to their respective embodiments and some variations are described above. Other variations are possible without departing from the claims of the invention as there recited. In some of these embodiments, for example, illustrated components may be integrated with each other or divided into subcomponents. There will often be additional components in the network node and in some cases fewer. The illustrations components may also perform other functions in addition to those described above, and some of the functions may alternately be performed elsewhere than as described in these examples.

Figure 4:
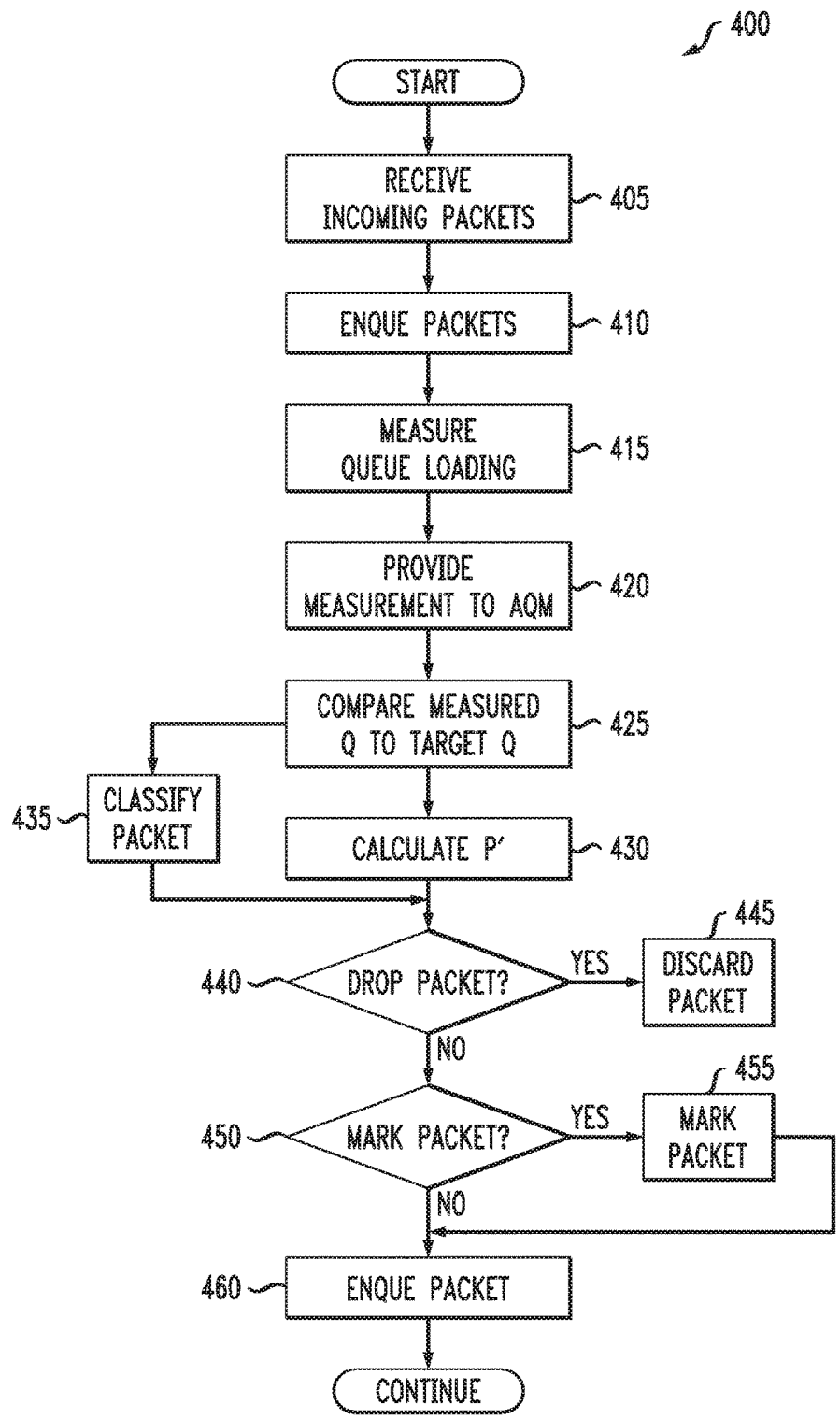
FIG. 4 is a functional block diagram illustrating selected components of a network node according to another embodiment of the present invention.

FIG. 4 is a flow diagram illustrating a method 400 according to an embodiment of the present invention. At START it is presumed that the components for performing the method are available and operational at least according to this embodiment. The process then begins with receiving incoming data packets (step 405). (This includes receiving a single data packet, an unlikely but not impossible occurrence.) The received packets, or at least a portion of them, are then placed in a buffer queue (step 410), where they will remain until forwarded or, in some cases, discarded.

In this embodiment, queue loading is measured (step 415), that is, the queue is evaluated to extract at least one measurement criteria. As mentioned above, these parameters may include, for example and not by way of limitation, instantaneous queue length, average queue length, packet sojourn time, incoming traffic rate, outgoing traffic rate, instantaneous packet queue overflow, and average queue overflow rate. Again, for the sake of convenience the measured parameter or parameters are referred to as Q. Q is then provided (step 420) to an AQM.

In the embodiment of FIG. 4, Q is then compared (step 425) to a Target Q, which has also been supplied (not separately shown) to the AQM. The Target Q is supplied in terms analogous to Q, that is, terms that can be compared to a measured parameter (or parameters) or to a derived value. A value p' may then be calculated (step 430) as a function of the difference (queue error) between Q and Target Q as found by the comparison. As used herein, $p'=p^{0.5}$ and p is the probability that a given packet will be dropped or marked in an effort to maintain given flow characteristics.

In the embodiment of FIG. 4, a packet's congestion control family is then determined (step 435), that is, whether the packet is part of a classic or scalable flow. Note that while it is presently preferred to make a determination for every received packet, this is not an essential feature of the invention unless explicitly recited in a particular embodiment. This determination may be made by an ECN classifier (see, for example, ECN classifier 240 shown in FIG. 2) or similar apparatus. For a marking decision, of course, it is generally if not absolutely necessary that packet be identified with a flow that is ECN capable (not separately shown). As mentioned above, in some embodiments an ECN classifier and a congestion-control family classifier may both be in operation.

In the embodiment of FIG. 4, a decision (step 440) whether to drop the packet in question is then made. As mentioned above, this decision d is preferably made as a squared drop decision function. This squared drop decision is made for example by comparing the p' value to two random values r1, r2. These values are in this embodiment regenerated for each packet. If both values r1 and r2 are smaller than p, then the decision d is to drop the packet. In an alternate embodiment, a drop decision results from a determination that p is smaller that both r1 and r2, and in some cases a single value may be used for some or all decisions, but this is not presently preferred. If a drop decision is made, a drop function discards the packet (step 445).

In the embodiment of FIG. 4, a decision whether to mark the packet in question (step 450) may also be made. Note that if a determination was made at step 440 that dropping is appropriate for a particular packet, then the marking decision will be, in effect, to not mark that packet and it cannot be enqueued. While in an alternate embodiment a marking decision may also be applied to a packet that was not dropped according to a drop decision d, this option is not presently preferred.

In some embodiments, for example where as mentioned above the ECN classifier is used to determine whether the packet is part of a scalable flow based on ECN capability, then the marking decision at step 450 is made by comparing p' to a random value r1. This is preferably true for all scalable flows in other embodiments as well. If, for example, p'>r1, then the packet is marked (step 455). In either case, in the embodiment of FIG. 4, the packet is allowed to pass into a queue buffer (step 460) for forwarding as appropriate.

Note that while in this embodiment, marking (if performed) occurs prior to enqueuing the packet (see also FIG. 2) it may be done after or as the packet is being forwarded from the queue buffer. Note also that especially where a single random value is used for a marking decision, a single random value r1 may be generated by the AQM and then used for the drop/mark decision (or decisions). If a second random value r2 is required for making a drop (or marking) decision, then r1 from the previous packet decision may be used as r2 for the current decision. (Naturally, for the "first" such decision, another random value may be used instead, for example generated as a separate operation (not shown) or perhaps retrieved from a memory storage location previously populated for this purpose.) The process then continues with treatment of any additional packets.

The processes described above may be carried out, for example, by a network node or an independent device, and may be implemented in hardware, software program instructions stored on a non-transitory computer readable medium and executable on a hardware device, or both. Although not preferred, in some embodiments, if explicitly recited the software program instructions may in whole or in part also be stored in or represented by a propagating signal.

Note that the sequence of operation illustrated in FIG. 4 represents an exemplary embodiment; some variation is possible within the spirit of the invention. For example, additional operations may be added to those shown in FIG. 4, and in some implementations one or more of the illustrated operations may be omitted. In addition, the operations of the method may be performed in any logically-consistent order unless a definite sequence is recited in a particular embodiment.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A method of data traffic congestion management in a network node, comprising:
   receiving data packets;
   enqueuing at least a portion of the received packets;
   determining whether to apply a drop decision to a received packet; determining, if applying a drop decision, whether to drop the received packet applying a squared drop decision, wherein the squared drop decision comprises generating at least one random value and making the drop determination when a drop probability is larger than the at least one generated random value and a second random value;
   wherein one of the random values is generated for each received packet and the other random value is a random value applied to the previous received packet;
   dropping a received packet for which a drop determination has been made; and
   forwarding from the network node, packets that have been received and not dropped.

2. The congestion-management method of claim 1, wherein a received packet is dropped prior to enqueuing the packet.

3. The congestion-management method of claim 1, further comprising:
   measuring load of queue buffer to extract at least one queue parameter Q;
   providing the at least at least one queue parameter to an AQM (active queue manager); and
   calculating a mark or drop probability as a proportional and integral control function on the Q parameter and a target Q parameter.

4. The congestion-management method of claim 3, wherein the drop or mark probability is also calculated using at least one of gain parameter $\alpha$ and gain parameter $\beta$.

5. The congestion-management method of claim 4, wherein at least one of $\alpha$ and $\beta$ remain constant for a given traffic flow.

6. The congestion-management method of claim 3, further comprising deciding, if not applying a drop decision, whether to mark a received packet using the calculated mark or drop probability.

7. The congestion-management method of claim 6, wherein the marking decision comprises generating at least one random value and making the mark determination when the mark probability is greater than the at least one random value.

8. The congestion-management method of claim 7, wherein a new random value is generated for each received packet for which a marking decision is to be made.

9. The congestion-management method of claim 3, wherein the at least one queue parameter comprises a plurality of queue parameters.

10. The congestion-management method of claim 1, wherein the determination of whether to drop a packet is a function of the type of flow in which the packet is received.

11. The congestion-management method of claim 7, further comprising marking a packet for which a determination to mark has been made.

12. A non-transitory computer-readable storage medium that stores computer readable instructions, which when executed by at least one processor implement a method for congestion management, the method comprising:
   receiving data packets;
   enqueuing at least a portion of received packets;
   determining whether to apply a drop decision to a received packet; determining, if applying a drop decision, whether to drop the received packet applying a squared drop decision, wherein the squared drop decision comprises generating at least one random value and making the drop determination when a drop probability is larger than the at least one generated random value and a second random value;
   wherein one of the random values is generated for each received packet and the other random value is a random value applied to the previous received packet;
   dropping a received packet for which a drop determination has been made; and
   forwarding from the network node, packets that have been received and not dropped.

13. The computer-readable storage medium of claim 12, the implemented method further comprising:
   measuring load of queue buffer to extract at least one queue parameter Q;
   providing the at least at least one queue parameter to an AQM; and
   calculating a mark or drop probability as a proportional and integral control function on the Q parameter and a target Q parameter.

14. The computer-readable storage medium of claim 13, wherein the squared drop decision is applied using a drop probability that is proportional with the square of the calculated mark or drop probability.

* * * * *